(12) United States Patent
Galbiati (10) Patent No.: US 8,415,908 B2
(45) Date of Patent: Apr. 9, 2013

(54) DRIVING APPARATUS FOR ELECTRIC MOTOR AND RELATED METHOD

(75) Inventor: Ezio Galbiati, Agnadello (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 329 days.

(21) Appl. No.: 12/969,274

(22) Filed: Dec. 15, 2010

(65) Prior Publication Data

US 2011/0156622 A1    Jun. 30, 2011

(30) Foreign Application Priority Data

Dec. 28, 2009  (IT) .............................. MI2009A2309

(51) Int. Cl.
*H02P 6/08* (2006.01)
(52) U.S. Cl.
USPC ................... 318/400.2; 318/400.35; 318/599; 318/799; 318/800; 318/801
(58) Field of Classification Search ............... 318/400.2, 318/400.35, 599, 799–801
See application file for complete search history.

(56) References Cited

U.S. PATENT DOCUMENTS

| | | | |
|---|---|---|---|
| 5,345,156 A * | 9/1994 | Moreira | 318/400.04 |
| 5,969,491 A | 10/1999 | Viti et al. | |
| 6,121,736 A | 9/2000 | Narazaki et al. | |
| 6,137,253 A * | 10/2000 | Galbiati et al. | 318/599 |
| 6,208,160 B1 | 3/2001 | Boscolo et al. | |
| 6,421,258 B1 | 7/2002 | Soldavini et al. | |
| 2010/0171453 A1 | 7/2010 | Yasohara et al. | |

* cited by examiner

*Primary Examiner* — Bentsu Ro
*Assistant Examiner* — David Luo
(74) *Attorney, Agent, or Firm* — Seed IP Law Group PLLC (57) ABSTRACT

A driving apparatus drives a brushless motor that includes a plurality of windings. The apparatus comprises a plurality of switch half-bridges connected to a power line and to the windings, a memory adapted to contain a plurality of signal profiles to be cyclically applied to the plurality of windings of the motor, a multiplier for multiplying the profile values of the signals from the memory by a scale factor, a control circuit adapted to generate PWM signals for the switches of the plurality of switch half-bridges according to values output by the multiplier, a polarity detector configured to detect the polarity of the current passing trough at least one winding of the motor and a scale factor controller configured to modify the scale factor according to the detected current polarity and so as to make each signal profile to be applied to each winding of the motor either higher than the back-electromotive force or equal to the back-electromotive force generated by the motor.

24 Claims, 10 Drawing Sheets

DRIVING APPARATUS FOR ELECTRIC MOTOR AND RELATED METHOD

BACKGROUND

1. Technical Field

The present disclosure relates to a driving apparatus for an electric motor, in particular a brushless motor, and related method.

2. Description of the Related Art

It is known that direct current, electronically switching brushless motors may be driven either in "current mode", i.e., by controlling the current crossing the motor windings, or in "voltage mode", i.e., by controlling the voltage which is applied to the motor windings. In voltage mode driving systems, there is no feedback loop, and the voltage applied to the motor is directly proportional to the reference value multiplied by a given gain.

Figure 1:
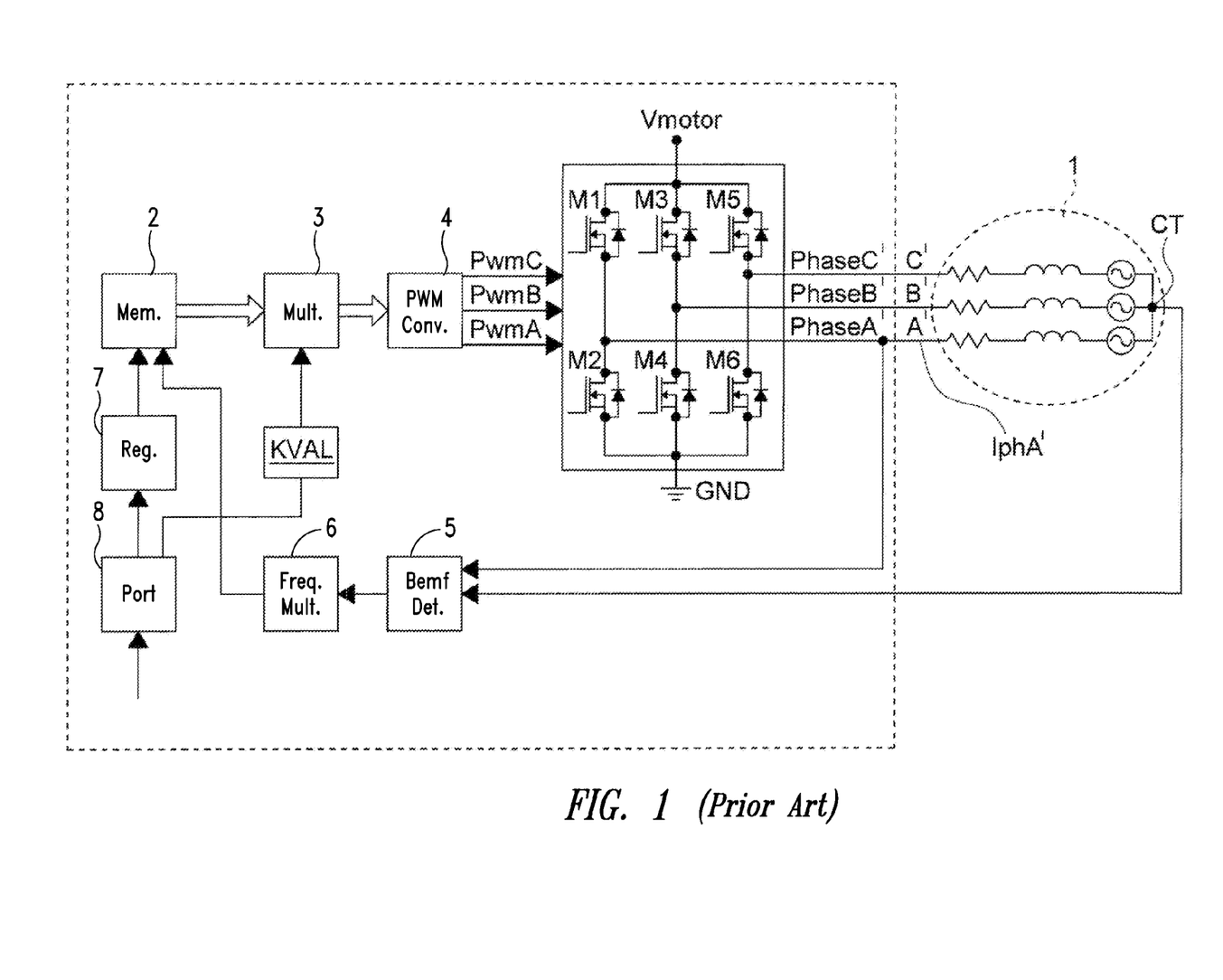
FIG. 1 shows a chart of a driving apparatus of a brushless motor in accordance with the prior art.
Figure 2A:
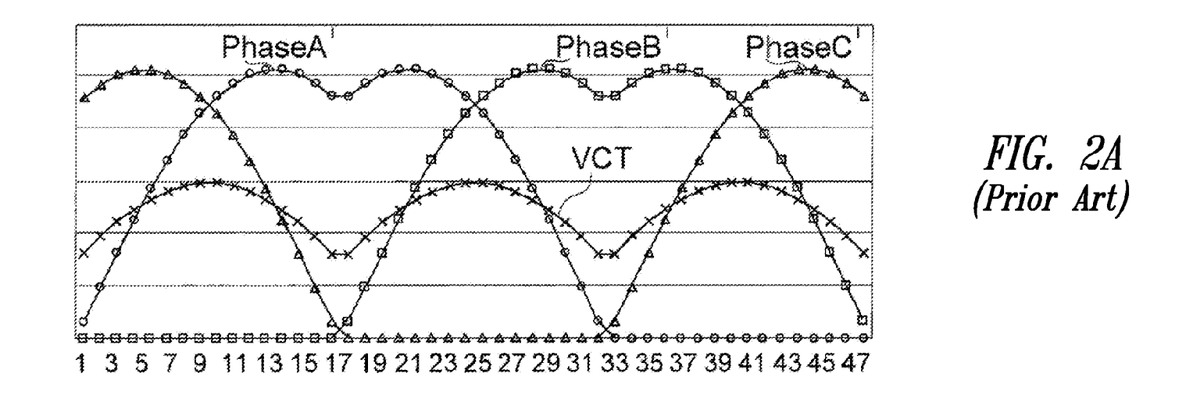
FIGS. 2a and 2b show time charts of the concerned voltages in the apparatus in FIG. 1.

U.S. Pat. No. 6,137,253 describes a voltage mode driving method of a brushless motor; FIG. 1 shows a block chart of a driving system implementing the aforesaid and which is applied to a spindle motor 1. Energizing voltages PhaseA'-PhaseC' 1, i.e., the voltages between the terminals A', B', C' and ground GND shown in FIG. 2a along with voltage VCT at the star point CT of motor 1, are forced on the ends of the phase windings of the spindle motor 1, which voltages instead of having a given predetermined constant level during each step of switching, have a given profile (not a constant value) previously defined, digitized and stored in a static memory 2.

The system comprises a multiplier 3, adapted to multiple the profiles stored in memory 2 by a scale factor KVAL, a device 4 adapted to convert to PWM the profiles output by said multiplier 3 so as to obtain the PWMA-PWMC control signal for the respective half-bridges M1-M2, M3-M4, M5-M6 connected between voltage Vmotor and ground GND and adapted to drive the spindle motor 1. The terminal of a respective phase winding of spindle motor 1 is connected to each output node of the three half-bridges.

The system comprises a back-electromotive force or Bemf detector 5 adapted to detect the instantaneous position of spindle motor 1 to allow the correct synchronization of the PhaseA-PhaseC voltage switchovers applied to the motor by the rotor position. The system comprises a frequency multiplier 6 adapted to multiply the frequency output from the detector 5 by a factor equal to the number of samples with which the voltage profile contained in the memory may be discretized. The frequency output from block 6 is used by block 2 as a clock to scan the memory registers.

The register 7 contains the starting address from where to start scanning the profile stored in the memory at the next detection of the zero crossing of the Bemf.

The content of the register 7 and the KVAL factor may be inserted by means of a serial port 8. According to the KVAL value, the voltage value applied to the motor is modulated in amplitude from zero to its maximum value.

Figure 2B:
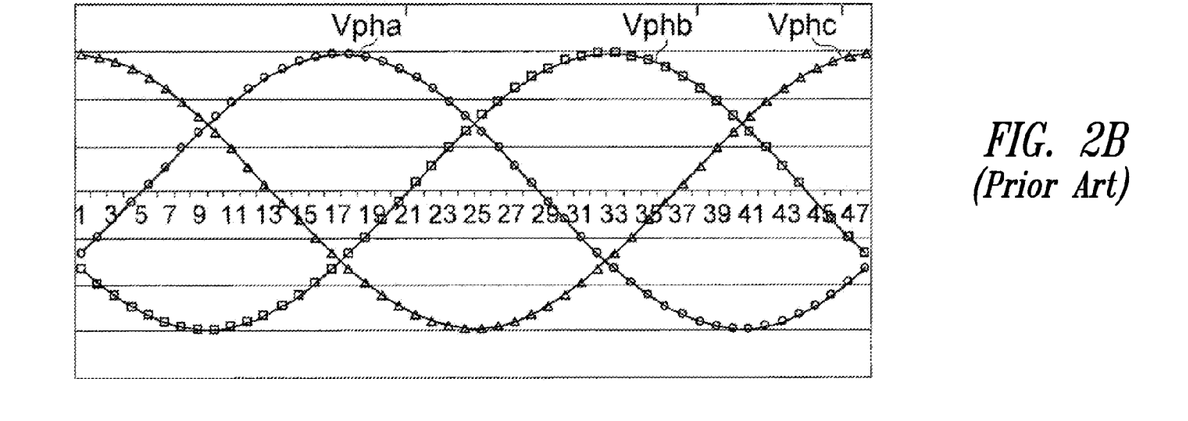

In a voltage mode-type, brushless motor driving system, the motor current is not directly controlled but depends on the voltage applied according to the relation:

$$Vpha' = Rma \times Ipha' + Lma \times \frac{dIpha'}{dt} + Bemf\_pha'$$

where Vpha' is the differential voltage between the voltage PhaseA' and the star point CT of the spindle motor 1, Rma and Lma and the resistance and the inductance of the winding of Phase A' of motor 1, Ipha' is the current in the winding of Phase A' and Bemf_pha' is the back-electromotive force of Phase A', i.e., the back-electromotive force between terminal A' and terminal CT. Voltages Vpha', Vphb' and Vphc' are shown in FIG. 2b.

Under normal operating conditions of a hard disk having spindle motor driven by a voltage mode type system, the differential voltage Vpha' applied to the motor is generally always higher than the back-electromotive voltage Bemf_pha' so as to generate a current which produces a positive torque in the motor. If the voltage Vpha' is lower than the back-electromotive force Bemf_pha', a current inversion occurs in the motor.

The current is generally supplied to the motor 1 from the external power through the power stage, e.g., the transistor half-bridges M1-M2, M3-M4, M5-M6 connected between voltage Vmotor and ground GND in FIG. 1; the normal current flow is directed from the external power to the motor.

If the voltage Vpha' is lower than the back-electromotive force Bemf_pha', the spindle motor acts as a generator and the current instead of being supplied by the external power is generated by the motor itself.

Under this condition, the current polarity is inverted with respect to normal operating condition and the current flow in this case is directed from the motor to the external power.

If the external power has a poor absorption capacity, the current is pushed back by the motor, i.e., there are no components connected to the power line capable of absorbing such a current, said current will therefore produce a voltage increase, the value of which will depend on the amplitude of the current and the duration of the driving step in which the back-electromotive voltage is higher than the voltage applied to the motor. This increase of power voltage, if not controlled, may be very dangerous for the application and cause breakage of the output stage which controls the motor due to overvoltage. During operation of a hard disk, this condition may be caused by a KVAL factor programming significantly lower than the previous one. The KVAL factor value is defined by the speed control routine of the hard disk: in order to keep the adjusting speed, the speed control system corrects KVAL according to the error between real speed and desired speed. Normally, these corrections are minor and do not produce any condition in which the voltage applied to the motor is lower than the value of the back-electromotive force. However, if the desired speed is changed to a lower value, the control loop reacts by decreasing the KVAL factor value, decreasing the voltage applied to the motor and causing the motor to slow down towards the new desired value. In such a case, the KVAL factor value programmed by the speed control circuit is such to provide the motor with a lower voltage as compared to the Bemf generated by the same, and thus until the motor has slowed down to the new desired speed, the current is inverted, because it is generated by the motor, and an overvoltage may occur on the power line.

Figure 3:
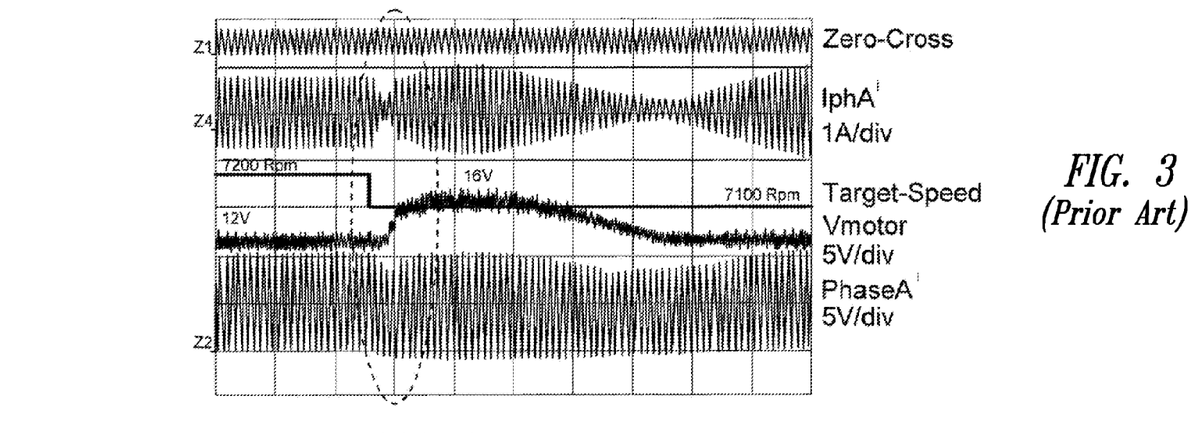
FIG. 3 shows time charts of voltages and currents in the apparatus in FIG. 1 in which there is a change of motor speed, and which shows the filtered equivalent waveform of the real PWM voltage applied to phase A of the motor related to voltage PhaseA'.
Figure 4:
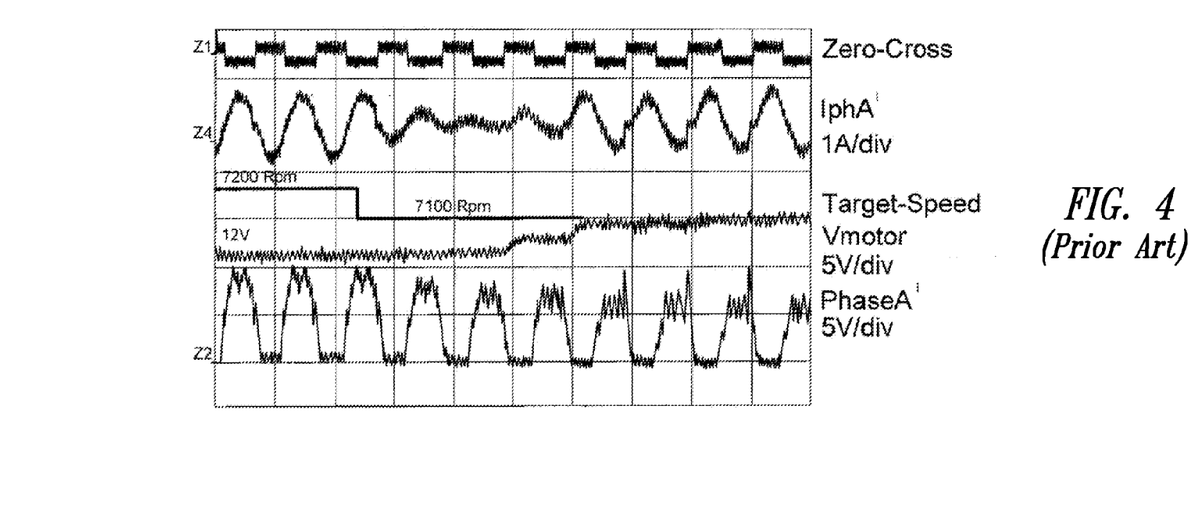
FIG. 4 shows part of the charts in FIG. 3 in more detail.

FIG. 3 and more in particular FIG. 4 show what occurs when in a real application with speed control active, the desired speed is varied from 7200 rpm to 7100 rpm; the figures show the voltage PhaseA' and the current Ipha', the Target-Speed signal for the desired signal programming change, the power voltage Vmotor and the Zero-Cross signal, the value of which changes from positive to negative whenever the current crosses zero. When Target-Speed changes, the control loop based on an integral proportional filter with Kp and Ki constants, for example, reacts thus gradually decreasing the KVAL factor value. When the KVAL factor value is such that the back-electromotive voltage of the motor exceeds the voltage applied to the motor, the current polarity is inverted and instead of flowing from the external power supply to the motor, it flows from the motor to the power supply, thus causing a voltage increase on the Vmotor line, which from initial 12V is raised to 16V, as better shown in FIG. 4, which is a detailed part of the time chart in FIG. 3; there is a current inversion in the motor and the subsequent voltage increase on the Vmotor line caused by a decrease of the programmed KVAL factor by the speed control which reacts to the desired speed decrease.

The voltage increase on the Vmotor line then gradually disappears when the real speed reaches the new desired speed, re-establishing a situation in which the current deriving from the external power supply is driven in the motor by the control circuit. The voltage increase on the Vmotor line, generated by this operating condition, is absolutely not controlled and may be influenced by various factors, such as the extent of the desired speed decrease, the value of Kp and Ki coefficients of the integral proportional filter of the speed control loop, the electromechanical features of the motor (Rm, Lm, inertia, etc.).

BRIEF SUMMARY

One embodiment is a driving apparatus for an electric motor, in particular a brushless motor, which is different from the known apparatuses.

One embodiment is a driving apparatus for an electric motor, in particular a brushless motor, comprising a plurality of windings, the apparatus comprising a plurality of switch half-bridges connected to a power line and a plurality of windings for driving the motor, a memory adapted to contain a plurality of signal profiles to be cyclically applied to the plurality of windings of the motor, a multiplier for multiplying the profile values of the signals from the memory by a scale factor, a control circuit adapted to generate PWM signals for the switches of said plurality of switch half-bridges according to values output from said multiplier, characterized in that it comprises detection means adapted to detect the polarity of the current which flows through at least one winding of the motor and first means adapted to modify the scale factor according to the current polarity detected and so as to make each signal profile to be applied to each winding of the motor either higher than the back-electromotive force or equal to the back-electromotive force generated by the motor.

BRIEF DESCRIPTION OF THE SEVERAL VIEWS OF THE DRAWINGS

The features and the advantages of the present disclosure will be apparent from the following detailed description of a practical embodiment thereof, shown by way of non-limitative example in the accompanying drawings, in which.

DETAILED DESCRIPTION

Figure 5:
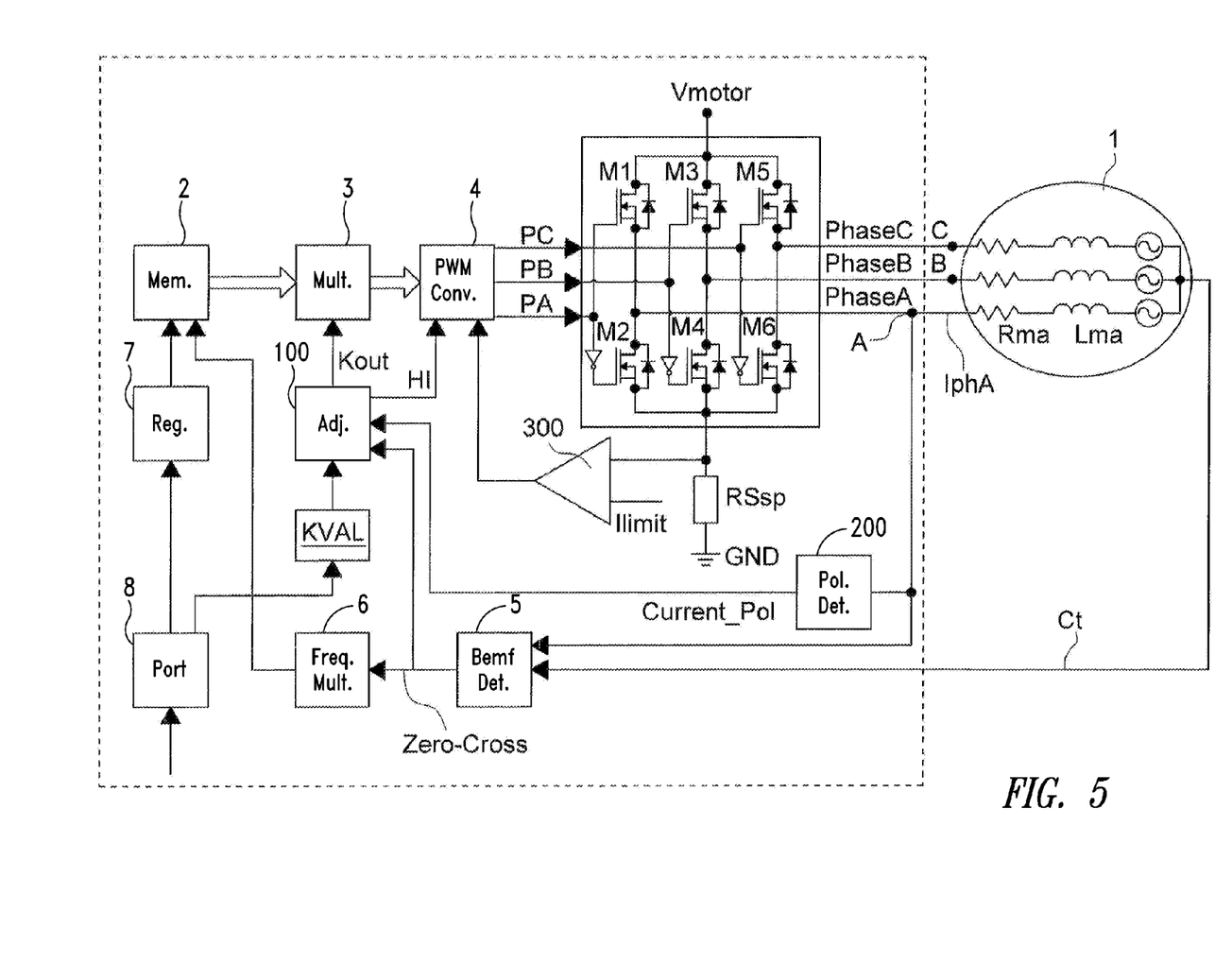
FIG. 5 shows a chart of a driving apparatus of a brushless motor in accordance with the present disclosure.

FIG. 5 shows a diagram of a driving apparatus for a brushless motor in accordance with the present disclosure.

The apparatus comprises a memory 2 adapted to digitally contain the energizing voltage profiles PhaseA-PhaseC to be cyclically applied to the windings of the brushless motor 1 (i.e., the voltages between the terminals A-C and ground GND), a multiplier 3 adapted to multiply the profiles stored in memory 2 by a value Kout, a PWM converter 4 adapted to convert to PWM the profiles output by the multiplier 3 to obtain the control signals PA-PC for the respective half-bridges M1-M2, M3-M4, M5-M6 connected between the voltage Vmotor and ground GND, and adapted to drive the spindle motor 1. Each output node of the three half-bridges is connected with the terminal of a respective phase winding of the spindle motor 1.

The apparatus comprises a back-electromotive force or Bemf detector 5 adapted to detect the instantaneous position of the spindle motor 1 to allow a correct synchronization between the PhaseA-PhaseC voltage switchovers applied to the motor by the rotor position. The system comprises a frequency multiplier 6 adapted to multiply the frequency output from the detector 5 by a factor equal to the number of samples with which the voltage profile contained in the memory may be discretized. The frequency output from block 6 is used by block 2 as a clock to scan the memory registers.

Register 7 contains the starting address from where to start scanning the profile stored in the memory at the next detection of the zero crossing of the Bemf.

The content of register 7 and KVAL factor may be supplied by a motor controller via a serial port 8.

The apparatus comprises a polarity detector 200 adapted to detect the current polarity which flows through at least one winding of the motor and to generate an output signal Current-Pol and a scale factor controller 100 adapted to vary the KVAL factor according to the detected current polarity Current-Pol so as to make the driving voltage PhaseA-PhaseC of each motor winding either higher than or equal to the back-electromotive force generated by motor 1, in particular the back-electromotive force generated by the corresponding winding of motor 1. Preferably, all motor driving voltages PhaseA-PhaseC may be modified by detecting the current in one winding of motor 1. Said means 100 have at the input the KVAL factor externally set by means of port 8, the Zero-Cross signal deriving from the device 5, i.e., the signal which detects the zero crossing of the back-electromotive force in the winding between terminal A and star point CT, and the Current_Pol signal deriving from the device 200.

The scale factor controller 100 is adapted to immediately correct the KVAL factor value preferably when the current polarity is inverted so as to prevent the current inversion in the motor. In this case, the Kout value will be different from the KVAL factor. The Kout value controls the amplitude of the motor driving voltage.

The polarity detector 200 is known, for example, from U.S. Pat. No. 6,421,258, which is incorporated herein by reference in its entirety.

Figure 6:
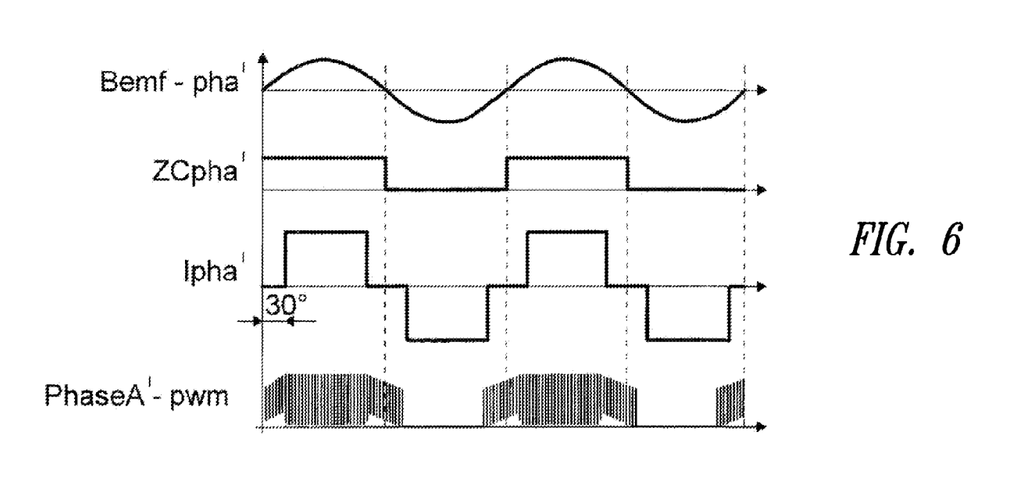
FIGS. 6 and 7 show time charts of the concerned signals in the apparatus in FIG. 1 with driving signals having square-wave and sinusoidal profiles if the voltage applied to a phase of the motor is higher than the respective back-electromotive force.
Figure 7:
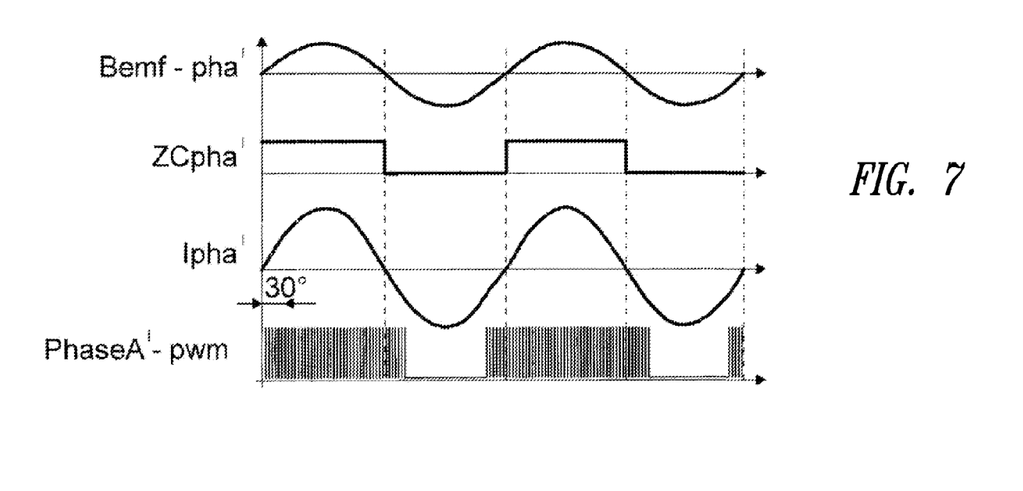

The apparatus in FIG. 5 may control the motor 1 with square-wave voltage profiles (named Six Step) or with sinusoidal voltage profiles (named Smooth Drive). This is known, and in both cases the voltage profiles are applied with a phase control with respect to the angular position, thus there is an accurate phase relation between the resulting current and the Bemf. FIGS. 6 and 7 show the voltage profile waveforms PhaseA'-pwm, PWM equivalent to voltage PhaseA', current IphA' flowing through the motor winding of phase A', Bemf of the same phase A Bemf-pha', i.e., the back-electromotive force between terminal A' and terminal CT, if the resulting voltage given by the difference of the voltage PhaseA'-pwm minus the voltage on the terminal CT is higher than Bemf-pha', for the known apparatus in FIG. 1. The signal ZCpha' is the output from the comparator which detects the zero crossing of the back-electromotive force of phase A Bemf-pha'; the similar Zero-Cross signal for the apparatus in FIG. 5 is used as a synchronization signal, again by the apparatus in FIG. 5. In FIG. 6, the apparatus uses Six Step type voltages, while in FIG. 7 the apparatus uses Smooth Drive voltages. In both cases, the power stage comprising the transistors M1-M6 in a half-bridge configuration is controlled in PWM mode. The current Ipha' is in-phase with the back-electromotive force Bemf-pha'; when the back-electromotive force Bemf-pha' is positive, the current Ipha' is also positive, and when the back-electromotive force Bemf-pha' is negative, the current Ipha' is also negative. This is the normal operating condition in which the motor is driven under conditions of maximum efficiency and the applied voltage is much higher than BEMF so as to generate a positive torque and keep the control of the motor speed.

Figure 8:
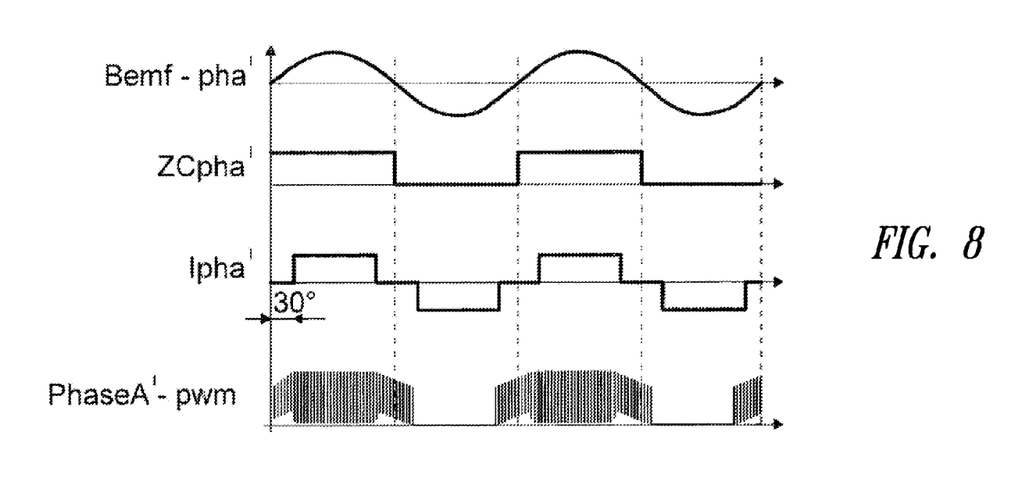
FIGS. 8 and 9 show time charts of the concerned signals in the apparatus in FIG. 1 with driving signals having square-wave and sinusoidal profiles if the voltage applied to a phase of the motor is lower than the respective back-electromotive force.
Figure 9:
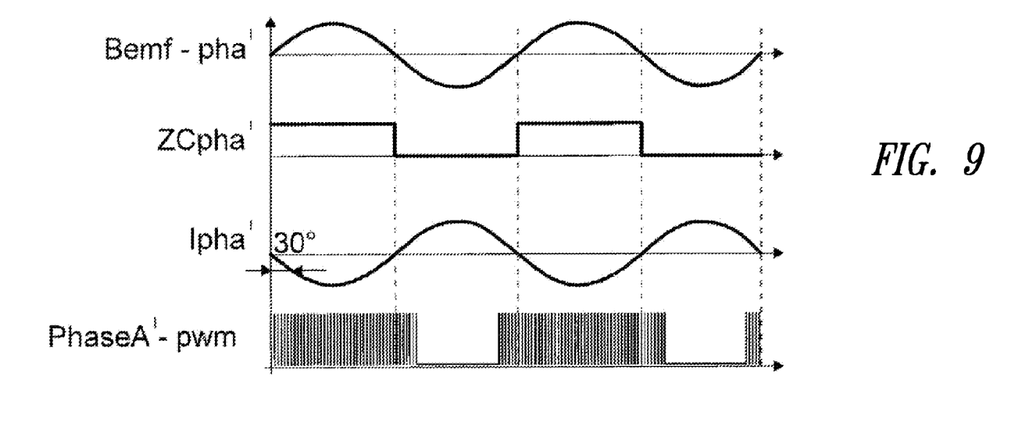

By using the Zcpha' signal as a trigger, e.g., the rising edge, by sampling the current Ipha' after 30 electric degrees, in both cases a positive value of the current is detected. Similarly, the situation is reversed if the falling edge is used. This applies both to the Six step and to the Smooth Drive methods. In both cases, the 30 degrees of delay of the positive or negative edge of the Zcpha' signal ensure the correct sampling of the current polarity; however, this value is to be considered by way of example, because it could take different values according to the type of application. FIGS. 8 and 9 show the same waveforms as FIGS. 6 and 7 if the voltage PhaseA'-pwm is lower than BEMF and thus the current is inverted when pushed by the motor towards the external power supply line.

Under these conditions, by sampling the current polarity with the same criteria described above, we will have negative current at 30 degrees after the positive edge of the ZCpha' signal, and positive current at 30 degrees after the negative edge of the ZCpha' signal.

In the apparatus in FIG. 5, under normal operating conditions of motor speed control, the KVAL value programmed by an external speed control circuit by means of the serial port 8, is updated at each electric revolution or at each mechanical revolution according to the operating mode. If the KVAL factor is updated at each electric revolution, the corrections of the KVAL factor itself in order to keep speed control are normally minor, and for this reason the detected current polarity is always correct. In this case, the scale factor controller 100 does not make any corrections and the Kout value is exactly the KVAL value programmed by the serial port 8.

The scale factor controller 100 corrects the KVAL factor from serial port 8, preferably if the polarity detector 200 indicates that, given a new programmed KVAL value, the current does not flows from the power line Vmotor to the motor 1 but is inverted.

This condition normally occurs when the new KVAL value is significantly lower than the programmed KVAL value at the previously electric revolution KVALprec. In this case, the significant decrease of the KVAL factor, with respect to the previous KVALprec value, drives the motor at a lower voltage as compared to the back-electromotive force and the current is inverted. As soon as the polarity detector 200 indicates to the scale factor controller 100 that the current IphA (where Ipha is the current in the winding of phase A, i.e., the current which flows through the winding between the terminals A and CT) is inverted, the Kout value is corrected, with respect to the programmed KVAL value by means of the serial port 8, so as to prevent current inversion.

The apparatus in FIG. 5 further includes a comparator 300 adapted to limit the current which passes through the power stage M1-M6 by comparing the current which passes through the resistor RSsp placed between the common terminals of the half-bridges M1-M2, M3-M4, M5-M6 and the ground GND with a current reference limit.

The scale factor controller 100 operates according to a correction algorithm of the Kout value with respect to the KVAL value received from the serial port 8; the algorithm sets that in the case of strong decrease of the KVAL factor, the Kout factor is decreased with controlled negative corrections so as to avoid inverting the current in the motor.

Figure 10:
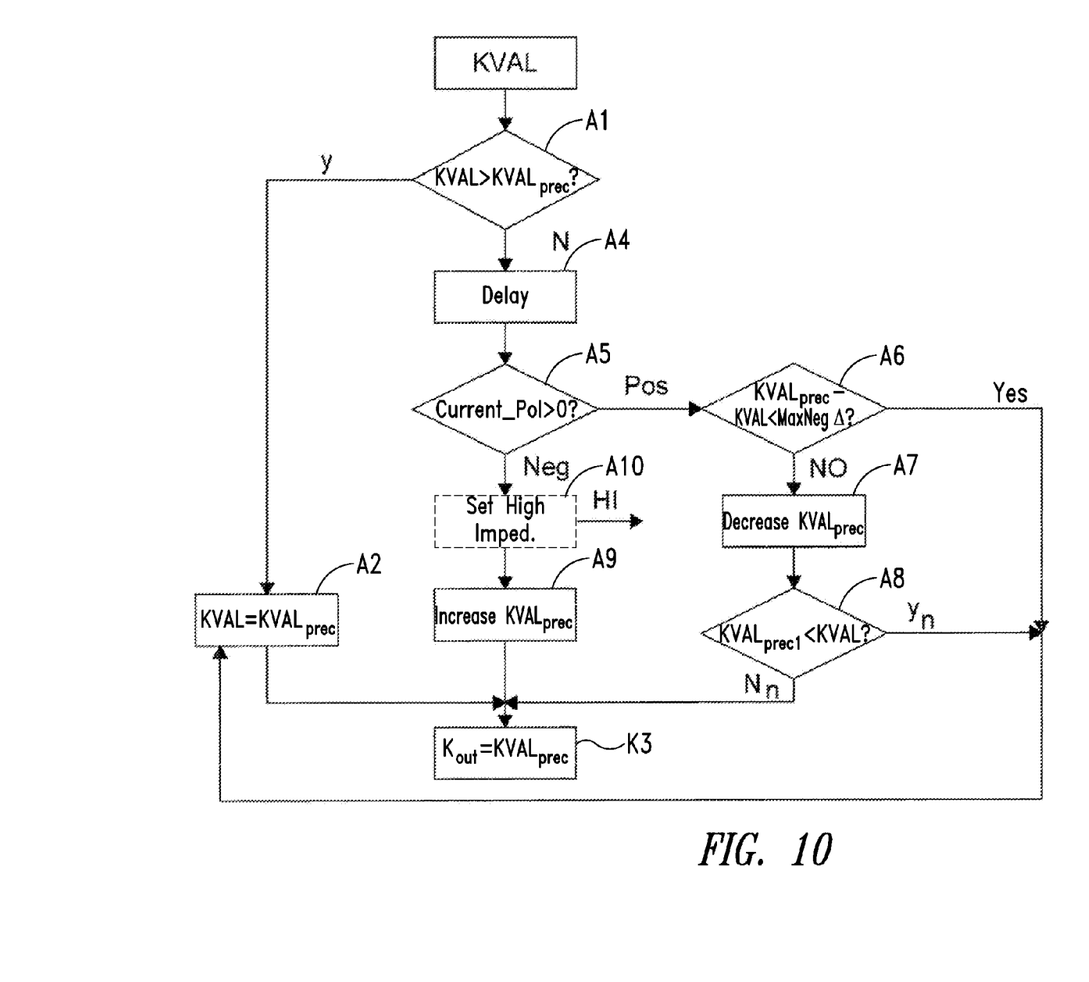
FIG. 10 is a block chart of the control method of the scale factor in which the means for changing the scale factor of the apparatus operate in accordance with the present disclosure.

FIG. 10 shows a flow chart of the correction algorithm of the Kout value in accordance with an embodiment of the disclosure. The control algorithm is activated at each electric revolution when the control speed of the motor programs a new value of the KVAL factor by means of port 8 and according to the speed error calculated by the same. Each new KVAL value is processed inside the scale factor controller 100.

Starting from a normal speed control condition with the motor speed being stable, the new KVAL value is compared with the KVALprec value of the KVAL of the previous electric revolution at step A1, i.e., at each rising edge or falling edge of the Zero-Cross signal for detecting the zero crossing of the back-electromotive force. If KVAL>KVALprec, indicated by Y in FIG. 10, there is no risk for generating an inversion of the current in the motor when the voltage applied to the motor is certainly higher than Bemf. In this case, the scale factor controller 100 does not carry out any correction and the new KVAL value is the Kout value; in particular, KVALprec is set to KVAL (KVAL=KVALprec) at step A2 and Kout is set to KVALprec (Kout=KVALprec) at step A3.

If upon a strong disturbance which tends to accelerate the motor 1 or a decrease the desired speed, in order to keep the speed under control, the new KVAL value is lower than the KVALprec value (KVAL at the previous electric revolution), indicated by N in FIG. 10, the inversion of the motor current may occur. In this case, the algorithm of the scale factor controller 100, after a delay Td preferably equal to 30 electric degrees in step A4, checks the current polarity in the motor at the previous electric revolution, i.e., the Current_Pol current signal is checked at step A5.

If the current polarity is positive, indicated by Pos in FIG. 10, proceed to step A6 in which the decrease of KVAL is checked to be lower than a MaxNegΔ value, i.e., KVALprec−KVAL<MaxNegΔ; if the comparison is positive, i.e., if KVALprec−KVAL<MaxNegΔ indicated by YES in FIG. 10, the new KVAL value is immediately applied to Kout, in particular KVAL=KVALprec is set at step A2 and Kout=KVALprec is set at step A3.

If the comparison is negative, i.e., if KVALprec−KVAL>MaxNegΔ indicated by NO in FIG. 10, the KVALprec is decreased by the decKval value during step A7 and the new value KVALprec1=KVALprec−decKval is compared with the KVAL value in step A8; if the new KVALprec1 value is lower than the KVAL value, indicated by Yn in FIG. 10, KVAL=KVALprec is set at step A2 and Kout=KVALprec=KVAL is set at step A3.

If the new KVALprec1 value is higher than the KVAL value, indicated by Nn in FIG. 10, Kout=KVALprec1 is set at step A3. Thereby, the decrease of the KVAL value is gradually controlled to avoid inverting the current in the motor.

If the current polarity is negative, indicated by Neg in FIG. 10, it means that the programmed KVALprec value of the previous electric revolution has generated an inversion in motor 1. The system thus recovers the situation by increasing the KVALprec value by an incKVAL value obtaining the KVALprec2 value at step A9 and setting the Kout value equal to the new KVALprec2 value at step A3. Thereby, the voltage applied to the motor is increased so as to exit the current inversion condition.

MaxNegΔ, incKVAL, decKVAL values are preferably a percentage of the maximum KVAL value and may vary from application to application.

Therefore, the new KVAL factor value is replaced by the scale factor controller 100 by either the KVALprec2 value if the current polarity is negative or the KVALPrec1 value if the current is positive and if KVALprec−KVAL>MaxNegΔ and KVALPrec1 is lower than KVAL; in all cases, the Kout value is equal to the new KVAL value.

The scale factor controller 100 checks the KVAL value from the speed control circuit, and in the case of strong negative variations of the KVAL value, the KVALout value output from the scale factor controller 100 is gradually decreased by controlling the polarity of the motor current thus avoiding its inversion.

Figure 11:
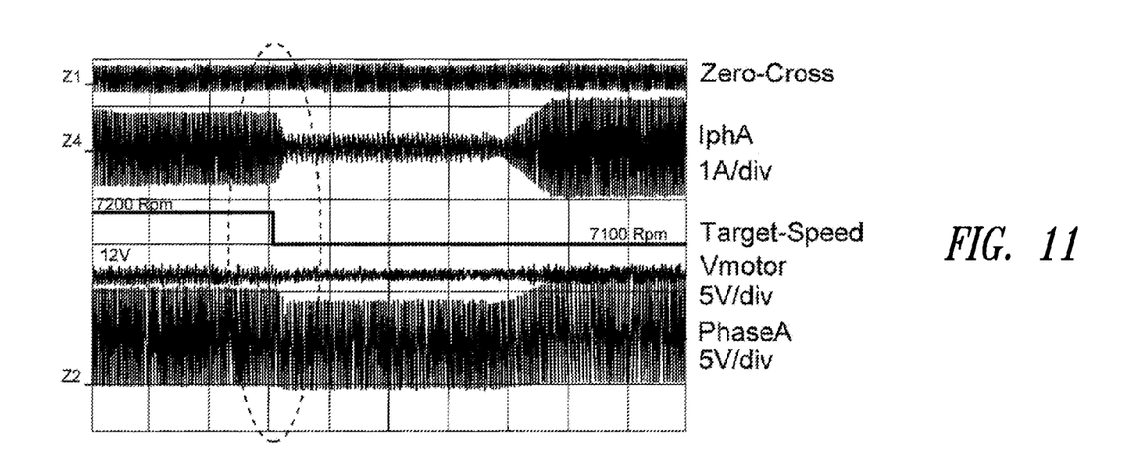
FIG. 11 shows time charts of voltages of the apparatus in FIG. 5 by applying the method in FIG. 10 in which there is a motor speed change.

FIG. 11 shows an example of what occurs in a real application by implementing the KVAL control by the scale factor controller 100 when the desired speed is varied from 7200 rpm to 7100 rpm. When the desired speed is changed, the speed control loop (not shown in the figure) based on an integral proportional filter (PI), reacts by gradually decreasing the KVAL value. When the KVAL value is such that the back-electromotive voltage of the motor tends to exceed the voltage applied to the motor, i.e., Bemf-phA>VphA, (where Bemf-pha is the back-electromotive force between the terminal A and the terminal CT and VphA is the differential voltage between the voltage PhaseA and the voltage of the star point CT of spindle motor 1), the control algorithm of the scale factor controller 100 detects that the current Ipha of the motor starts to invert the polarity, thus it operates by limiting further decreases of the KVAL value which would certainly cause an inversion of the motor current with consequent generation of overvoltage on the power supply line. FIG. 11 shows the voltage PhaseA and the current Ipha, the change signal for changing the Target-Speed programming, the power voltage Vmotor and the Zero-Cross signal which changes its value from positive to negative whenever the current crosses zero; it is worth observing that under the same conditions of the apparatus in FIG. 1, an overvoltage was generated on the power line Vmotor (FIG. 3), the power line Vmotor now remains stable at nominal value.

Figure 12:
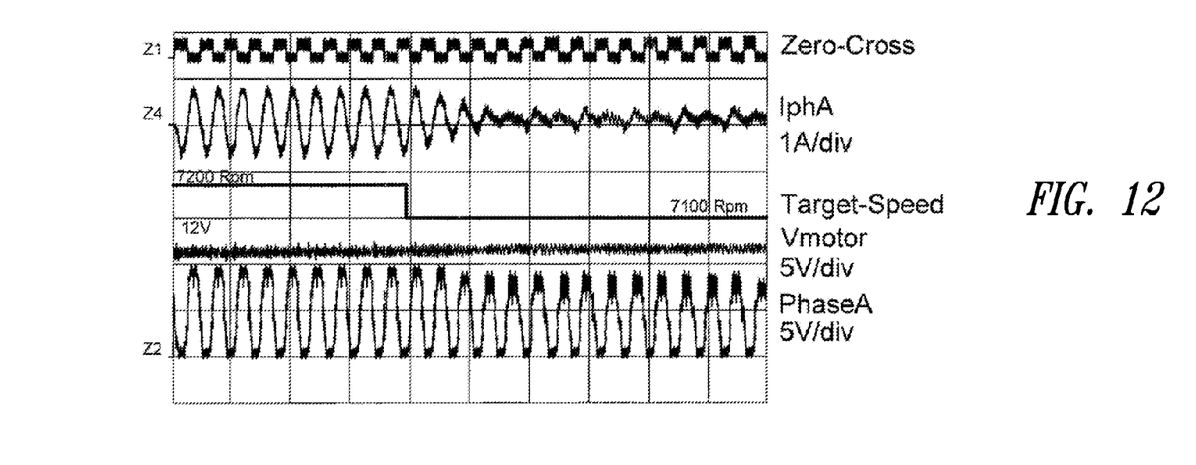
FIG. 12 shows part of the charts in FIG. 11 in more detail.

FIG. 12 shows part of the diagrams in FIG. 11 in more detail: it may be better observed that the decrease of the KVAL value, controlled by the scale factor controller 100, decreases the motor current to the inversion threshold and this level is kept until the real speed of the motor reaches the new desired thus avoiding to generate rises of the Vmotor line.

A variant of the embodiment of the present disclosure is also shown in FIG. 10. The only difference with respect to the embodiment of the previously described algorithm in FIG. 10 is that a step A10 is inserted between step A5 and step A9, in which when an inverted current condition is detected in the motor, the power step of the half-bridges M1-M6 is set to a high impedance state, by means of a HI control, until the next detection of the rising edge of the Zero-Cross signal. Thereby, when the back-electromotive force generated by the motor is higher than the voltage applied to the same, i.e., when Bemf-phA>VphA, with the power stage M1-M6 set to high impedance, motor 1 does not generate current and the current inversion condition to the external power is avoided. When the next rising edge is detected, the power stage M1-M6 is enabled again to allow to control the current polarity according to a new KVAL value.

If the current polarity is inverted again, the power stage M1-M6 is set to high impedance state again, until the next cycle and until the real speed reaches the new desired speed.

Figure 13:
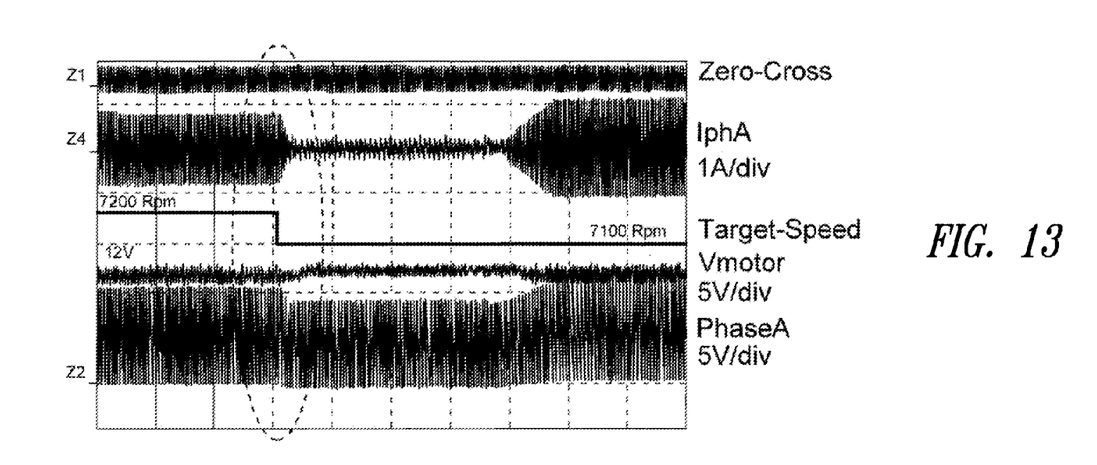
FIG. 13 shows time charts of the voltages of the apparatus in FIG. 5 by applying a variant of the method in FIG. 10 in which there is a motor speed change.
Figure 14:
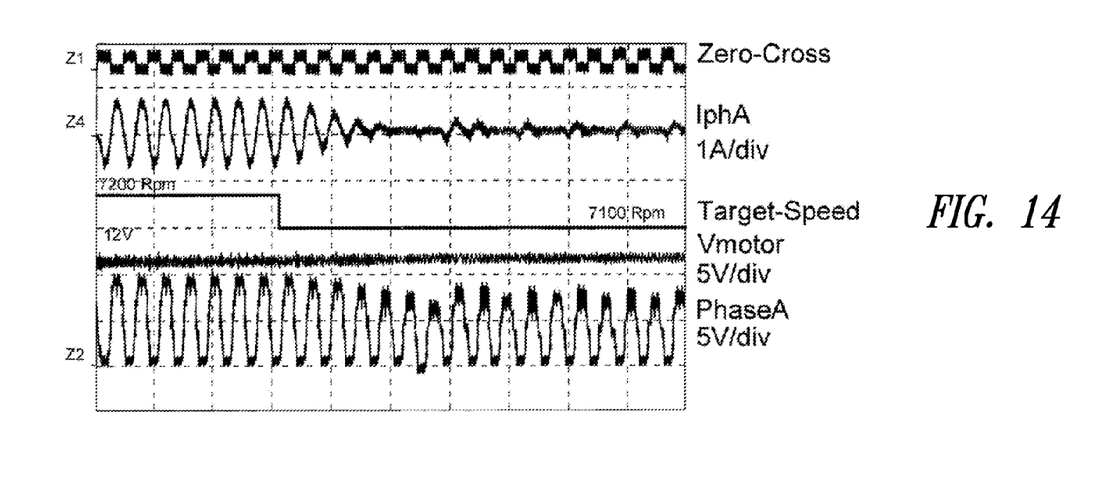
FIG. 14 shows part of the charts in FIG. 13 in more detail.

FIG. 13 shows the voltage PhaseA and the current Ipha, the change signal for changing Target-Speed programming, the power voltage Vmotor and the Zero-Cross signal which changes its value from positive to negative whenever the current crosses zero; it is worth observing that under the same conditions of the apparatus in FIG. 1 an overvoltage was generated on the power line Vmotor (FIG. 3), also in this case the Vmotor line now remains stable at nominal value. FIG. 14 shows more in detail a part of the charts in FIG. 13; it is worth noting that the power stage M1-M6, on a case by case basis, is set to high impedance by resetting the current in the motor thus avoiding to produce an inversion which causes an increase of the external power line Vmotor.

Figure 15:
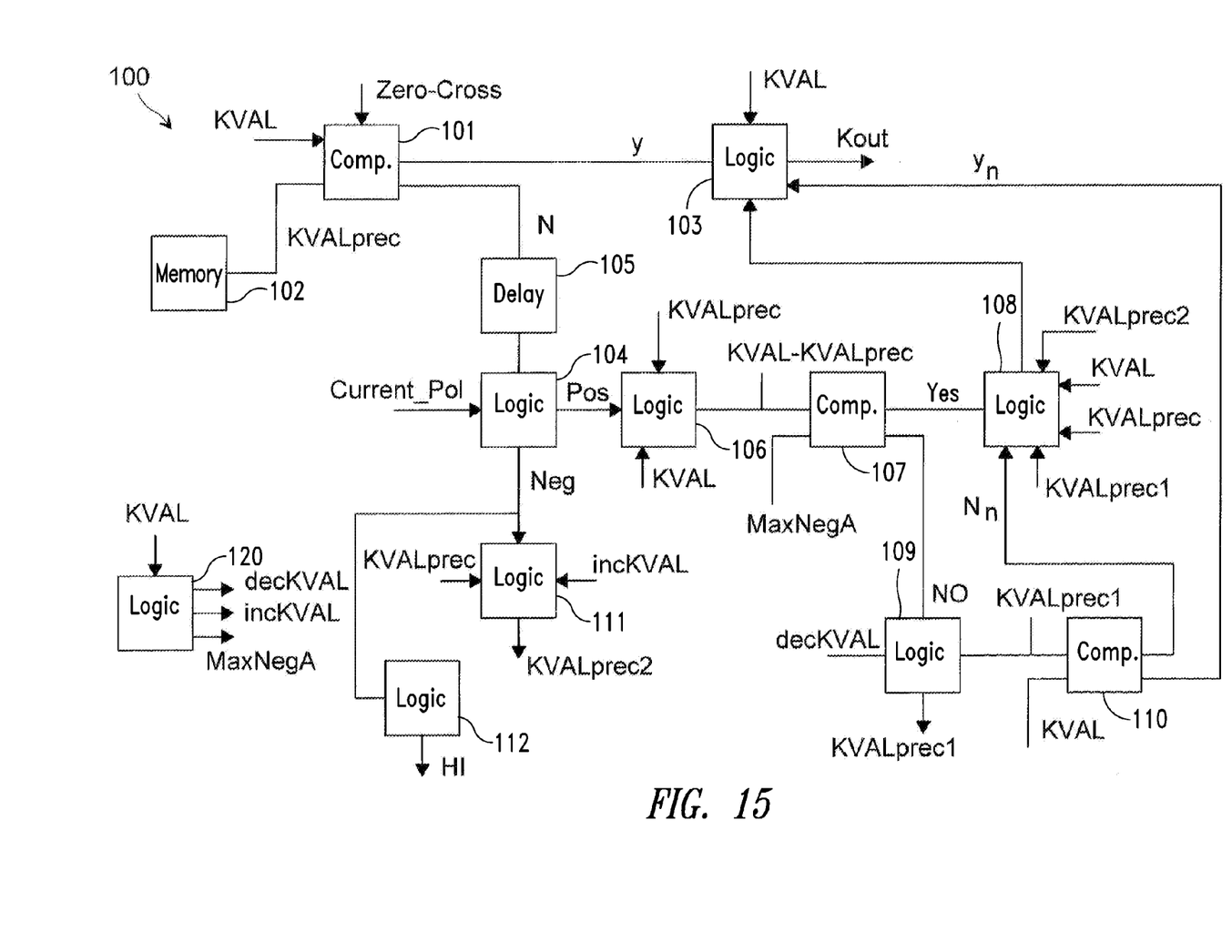
FIG. 15 shows an implementation of the means for changing the scale factor of the apparatus in FIG. 5.

A possible implementation of the scale factor controller 100 is shown in FIG. 15. The KVALprec value is stored in a memory 102 and compared by comparison means 101, e.g., a comparator, with a new KVAL value at each rising or falling edge of the Zero-Cross signal detecting the zero crossing of the back-electromotive force. If KVAL>KVALprec, an output signal indicated by Y in FIG. 15, controls a logical block 103, supplied by the new KVAL value, to set Kout=KVAL.

If the new KVAL value is lower than the KVALprec value (KVAL value of the previous electric revolution), another output signal indicated by N in FIG. 15, controls a logic block 104, after a delay 105 preferably equal to 30 electric degrees, checking the current polarity in the motor at the previous revolution, i.e., the current signal Current_Pol is checked.

If the current polarity is positive, i.e., there is no inversion and the current does not cross from motor 1 to the power line Vmotor, an output signal indicated by Pos in FIG. 15, activates a logical block 106 supplied by the KVALprec value and by the KVAL value to form the difference KVALprec−KVAL. A comparison element 107 compares the difference KVALprec−KVAL with the MaxNegΔ value; if KVALprec−KVAL<MaxNegΔ, a YES signal is sent in FIG. 10 to a logical block 108 which controls the logical block 103 to immediately apply the new KVAL value to Kout.

If KVALprec−KVAL>MaxNegΔ, a NO signal is sent to a logical block 109 adapted to decrease the KVALprec value of the decKVAL value and the new KVALprec1 value is compared with the KVAL value by means of another comparison element 110; if the new KVALprec1 value is lower than the KVAL value, sending a signal Yn to the logical block 103 which sets Kout=KVAL.

If the new KVALprec1 value is higher than the KVAL value, a Nn signal is sent to the logical block 108 which sets KVAL=KVALprec1 and sends the new KVAL value to the block 103 which emits Kout=KVALprec1. Thereby, the decrease of the KVAL value is gradually controlled to avoid inverting the current in the motor.

If the current polarity is negative it means that the programmed KVALprec value of the previous electric revolution has generated an inversion of the current in motor 1; a signal Neg is sent to a logical block 111, which increases the KVALprec value to the incKVAL value to have a new KVALprec2 value. The KVALprec2 value is sent to the logical block 108, which sets KVAL=KVALprec2 and to the logical block 103 which sets Kout=KVAL=KVALprec2. Thereby, the voltage applied to the motor is increased so as to exit from the current inversion condition.

The scale factor controller 100 in FIG. 15 comprises a block 120 which determines the MaxNegΔ, incKval, decKval values from the KVAL value as a percentage of the maximum KVAL value.

The scale factor controller 100 may also comprise a logical block 112 which is controlled by the Neg signal output from block 104 to generate a HI signal which sets the power stage of the half-bridges M1-M6 in a high impedance stage to the next detection of the rising edge of the Zero-Cross signal.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A driving apparatus for a brushless motor having a plurality of motor windings, the apparatus comprising:
   a plurality of switch half-bridges coupled to a power line and configured to be coupled to the plurality of motor windings;
   a memory configured to contain a plurality of signal profiles to be cyclically applied to the plurality of motor windings;
   a multiplier configured to multiply values of the signal profiles from said memory by a scale factor;
   a control circuit configured to generate PWM signals for switches of said plurality of switch half-bridges according to values output from said multiplier;
   a polarity detector configured to detect a polarity of a current which passes through at least one of the motor windings; and
   a scale factor controller coupled to the polarity detector and configured to make each signal profile to be applied to each motor winding either higher than a back-electromotive force generated by the motor or equal to the back-electromotive force depending on the polarity detected by the polarity detector.

2. An apparatus according to claim 1, wherein said scale factor controller is configured to increase said scale factor if the detected polarity is indicative of a current flow from the motor to the power line.

3. An apparatus according to claim 1, further comprising a back-emf detector configured to emit a back-emf detection signal each time that the back-electromotive force produced by the motor crosses zero, said scale factor modifier being configured to check the value of the scale factor for each positive or negative edge of said back-emf detection signal.

4. An apparatus according to claim 3, wherein said scale factor controller is configured to check the detected current polarity after a delay if a current scale factor value of said scale factor is lower than a previous scale factor value of a previous electric revolution of the motor.

5. An apparatus according to claim 4, wherein said scale factor controller is configured to replace said current scale factor value with a new value equal to the previous scale factor value increased by an increment value if said polarity is indicative of a current flow from the motor towards the power line.

6. An apparatus according to claim 4, wherein said scale factor controller is configured to leave said current scale factor value unchanged if the detected polarity is not indicative of a current flow from the motor towards the power line and if the difference between said current scale factor value and said previous scale factor value is higher than a threshold amount and said current scale factor value is higher than the previous scale factor value decreased by a decrement value.

7. An apparatus according to claim 4, wherein said scale factor controller is configured to replace said current scale factor value with the previous scale factor value decreased by a decrement value if the detected polarity is not indicative of a current flow from the motor to the power line and if the difference between said current scale factor value and said previous scale factor value is higher than a threshold and said current scale factor value is lower than the previous scale factor value decreased by said decrement value.

8. An apparatus according to claim 4, wherein said scale factor controller is configured to cause the plurality of switch half-bridges to enter into a high impedance state if the detected polarity is indicative of a current flow from the motor to the power line and the current scale factor value is lower than the previous scale factor value.

9. A method, comprising:
   driving a brushless motor that includes a plurality of motor windings using a plurality of switch half-bridges connected to a power line and to the motor windings, said driving including:
      storing a plurality of signal profiles to be cyclically applied to the plurality of motor windings,
      multiplying the driving signal profiles by a scale factor,
      generating PWM signals for said plurality of switch half-bridges according to values output from said multiplier,
      detecting a polarity of a current which passes through at least one of the motor windings,
      modifying the scale factor by making each signal profile to be applied to each motor winding either higher than a back-electromotive force generated by the motor or equal to the back-electromotive force depending on the detected polarity.

10. A method according to claim 9, wherein said modifying comprises increasing said scale factor in response to the detected polarity being indicative of a current flow from the motor to the power line.

11. A method according to claim 9, further comprising checking a zero crossing of the back-electromotive force produced by the motor, said modifying comprising checking the scale factor at each positive or negative edge of a signal indicative of the zero crossing of the back-electromotive force produced by the motor.

12. A method according to claim 9, wherein said modifying comprises checking the detected polarity after a delay if a current scale factor value of said scale factor is lower than a previous scale factor value of a previous electric revolution of the motor.

13. A method according to claim 12, wherein said modifying comprises, after checking the detected polarity, replacing said current scale factor value with a new value equal to the previous scale factor value increased by a first increment value if said polarity is indicative of a current flow from the motor towards the power line.

14. A method according to claim 12, comprising leaving said scale factor value unchanged if the detected polarity is not indicative of a current flow from the motor towards the power line and if a difference between said current scale factor value and said previous scale factor value is higher than a threshold amount and said current scale factor value is higher than the previous scale factor value decreased by a decrement value.

15. A method according to claim 12, wherein said modifying includes replacing said current scale factor value with the previous scale factor value decreased by a decrement value if the detected polarity is not indicative of a current flow from the motor to the power line and if a difference between said current scale factor value and said previous scale factor value is higher than a threshold amount and said current scale factor value is lower than the previous scale factor value decreased by said decrement value.

16. A method according to claim 12, causing the plurality of switch half-bridges to enter into a high impedance state if the detected polarity is indicative of a current flow from the motor to the power line and the current scale factor value is lower than the previous scale factor value.

17. A motor, comprising:
a plurality of motor windings,
a plurality of switch half-bridges coupled to a power line and configured to be coupled to the plurality of motor windings;
a memory configured to contain a plurality of signal profiles to be cyclically applied to the plurality of motor windings;
a multiplier configured to multiply values of the signal profiles from said memory by a scale factor;
a control circuit configured to generate PWM signals for switches of said plurality of switch half-bridges according to values output from said multiplier;
a polarity detector configured to detect a polarity of a current which crosses at least in one of the motor windings; and
a scale factor controller coupled to the polarity detector and configured to make each signal profile to be applied to each motor winding either higher than a back-electromotive force generated by the motor or equal to the back-electromotive force depending on the polarity detected by the polarity detector.

18. A motor according to claim 17, wherein said scale factor controller is configured to increase said scale factor if the detected polarity is indicative of a current flow from the motor to the power line.

19. A motor according to claim 17, further comprising a back-emf detector configured to emit a back-emf detection signal each time that the back-electromotive force produced by the motor crosses zero, said scale factor modifier being configured to check the value of the scale factor for each positive or negative edge of said back-emf detection signal.

20. A motor according to claim 19, wherein said scale factor controller is configured to check the detected current polarity after a delay if a current scale factor value of said scale factor is lower than a previous scale factor value of a previous electric revolution of the motor.

21. A motor according to claim 20, wherein said scale factor controller is configured to replace said current scale factor value with a new value equal to the previous scale factor value increased by an increment value if said polarity is indicative of a current flow from the motor towards the power line.

22. A motor according to claim 20, wherein said scale factor controller is configured to leave said current scale factor value unchanged if the detected polarity is not indicative of a current flow from the motor towards the power line and if the difference between said current scale factor value and said previous scale factor value is higher than a threshold amount and said current scale factor value is higher than the previous scale factor value decreased by a decrement value.

23. A motor according to claim 20, wherein said scale factor controller is configured to replace said current scale factor value with the previous scale factor value decreased by a decrement value if the detected polarity is not indicative of a current flow from the motor to the power line and if the difference between said current scale factor value and said previous scale factor value is higher than a threshold and said current scale factor value is lower than the previous scale factor value decreased by said decrement value.

24. A motor according to claim 20, wherein said scale factor controller is configured to cause the plurality of switch half-bridges to enter into a high impedance state if the detected polarity is indicative of a current flow from the motor to the power line and the current scale factor value is lower than the previous scale factor value.

* * * * *